United States Patent [19]
Strang

[11] 3,979,099
[45] Sept. 7, 1976

[54] VEHICLE SEAT PEDESTAL

[75] Inventor: Robert E. Strang, North Liberty, Ind.

[73] Assignee: The Injection Plastic Co., Inc., Plymouth, Ind.

[22] Filed: Sept. 8, 1975

[21] Appl. No.: 610,993

[52] U.S. Cl................................ 248/418; 248/425
[51] Int. Cl.² ........................................ F16M 13/00
[58] Field of Search .......... 248/415, 417, 418, 425; 297/349; 188/72.7, 72.9; 108/142

[56] References Cited
UNITED STATES PATENTS

| | | | |
|---|---|---|---|
| 2,234,344 | 3/1941 | Hedges | 248/415 |
| 2,380,055 | 7/1945 | Linden et al. | 188/72.7 |
| 3,147,946 | 9/1964 | Hale | 297/349 |
| 3,834,660 | 9/1974 | Leffler | 248/418 |
| 3,858,834 | 1/1975 | Eimen | 248/418 |
| 3,885,764 | 5/1975 | Pabreza | 248/415 |

Primary Examiner—Robert A. Hafer
Attorney, Agent, or Firm—Marmaduke A. Hobbs

[57] ABSTRACT

A pedestal for a vehicle seat in which a vertically positioned post is mounted on a base and suppports a horizontally rotatable platform pivotally connected to the upper part of the post. A means is provided for locking the seat in an angular position on the vertical axis of the post, and a latch means is preferably provided for centrally locating the seat in its forward position. The locking means includes a handle with a horizontal shaft extending inwardly on the platform for operating a lever to apply pressure to the platform and a plate at the upper end of the post to hold the platform firmly in an angularly adjusted position.

8 Claims, 7 Drawing Figures

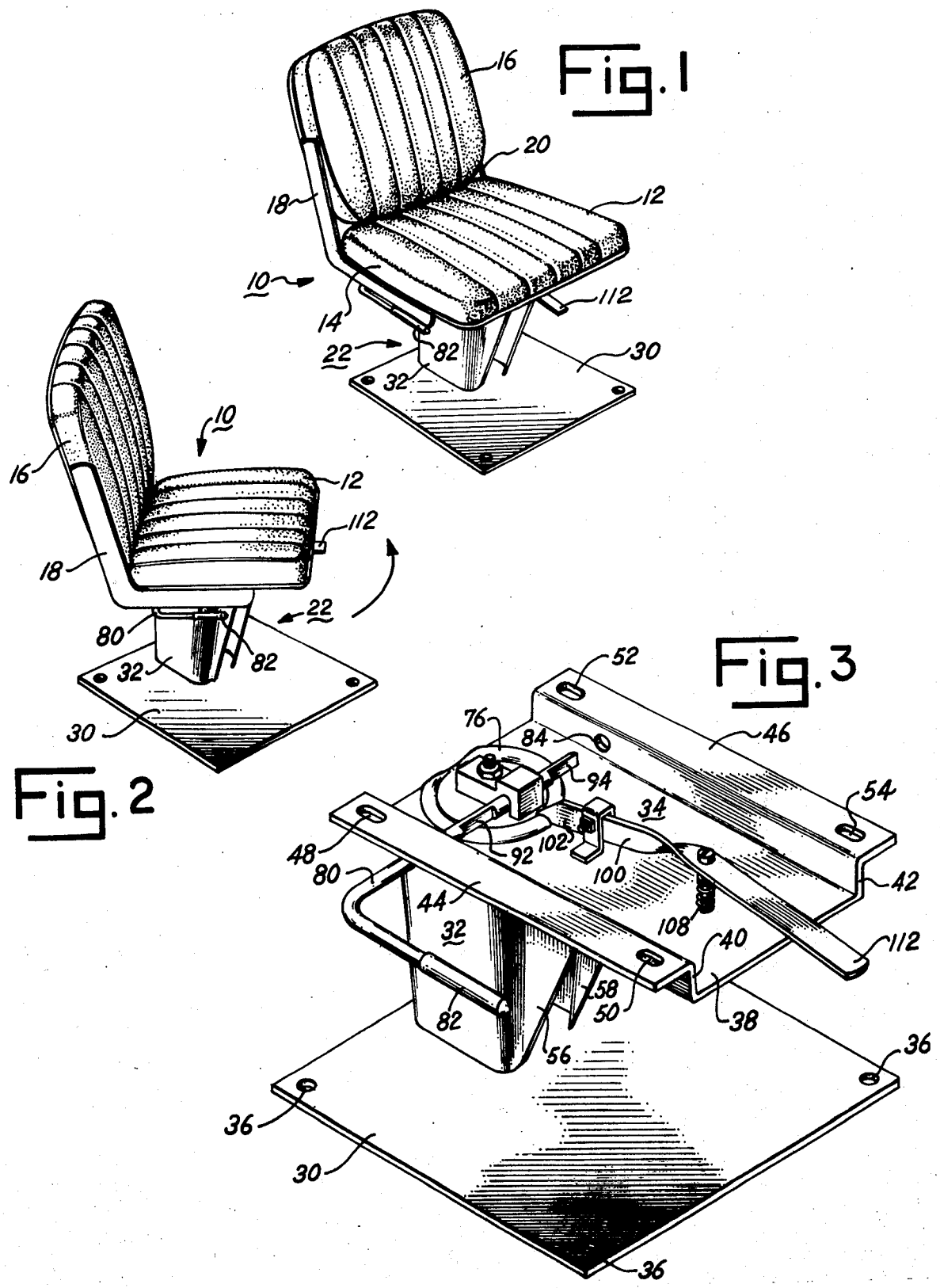

VEHICLE SEAT PEDESTAL

The conventional seat used in panel trucks, vans and similar vehicles is pivoted on a pedestal and rotates from the forward to side door positions to permit the driver and passenger to easily and conveniently leave and enter the vehicle. While the conventional seat permits the occupants to shift between the two positions, the seat is often loose and easily tiltable slightly from side-to-side and forward and backward when it is in its normal forward position, and is hence sometimes uncomfortable and unsafe for the occupant. It is therefore one of the principal objects of the present invention to provide a pedestal for a vehicle seat of the foregoing type which permits the seat to be shifted easily and conveniently between the forward and side positions, and which holds the seat firmly in place in the forward position while the vehicle is being driven.

Another object of the invention is to provide a seat pedestal for a vehicle which permits the seat to shift between the forward and side positions and, by the use of an easily operated control, centers and latches the seat in the forward position as the occupant shifts the seat from the side position to the forward position, and which, by the use of another easily operated control, firmly holds the seat in its forward position independently of the centering and latching means.

Still another object of the invention is to provide a pedestal for a vehicle seat which is simple in construction and operation, and which can be used for either the right or left front seat by merely reversing the control lever for holding the seat in its adjusted position.

A further object is to provide a vehicle seat pedestal of the aforesaid type, which can be easily fabricated and assembled using standard production equipment, tools and materials, and which can be adapted to most makes and models of panel trucks and vans without any appreciable modifications in the pedestal structure and operation.

Additional objects and advantages of the present invention will become apparent from the following description and accompanying drawings, wherein:

FIG. 1 is a perspective view of a seat and pedestal assembly embodying the present invention;

FIG. 2 is a perspective view of the seat and pedestal assembly shown in FIG. 1, illustrating the manner in which it rotates from the forward to the side position;

FIG. 3 is a perspective view of the present pedestal showing it with the seat removed therefrom;

Figure 4:
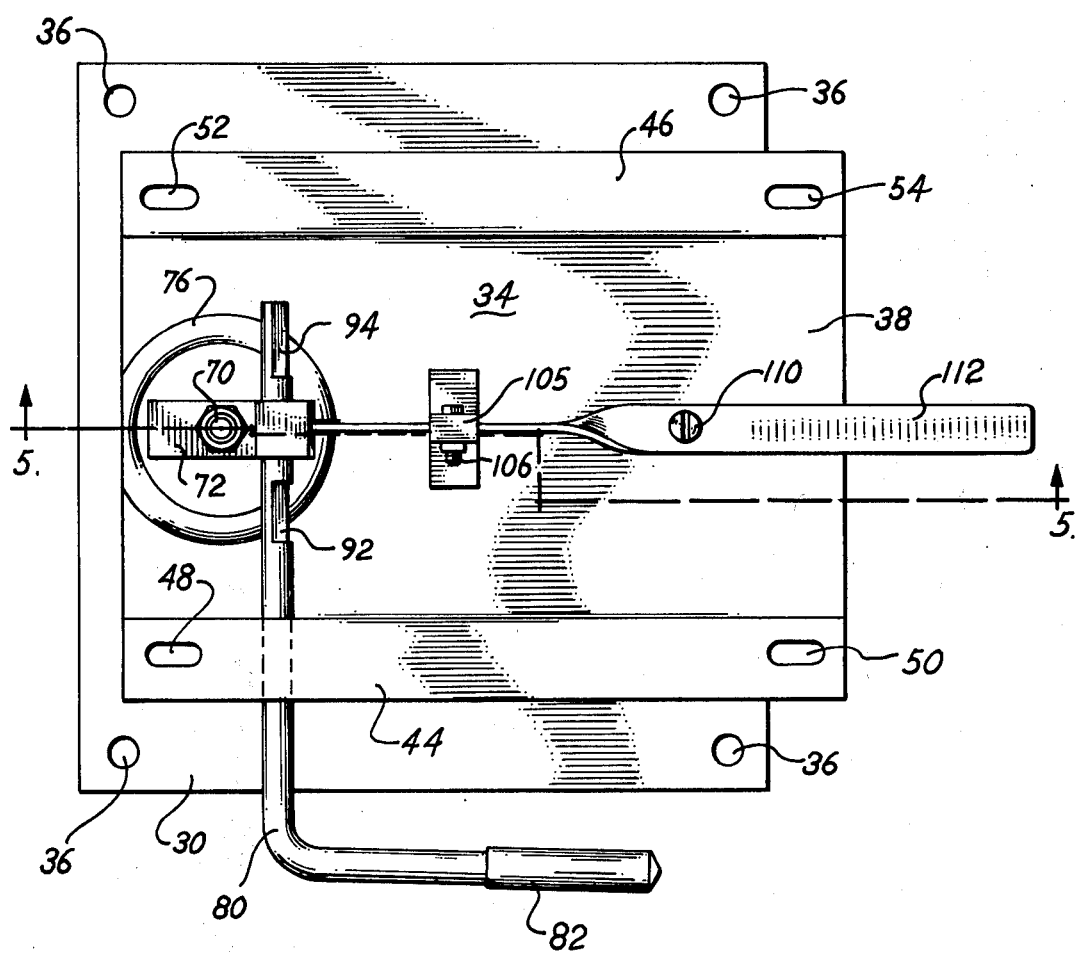
FIG. 4 is a top plan view of the seat pedestal shown in FIG. 3.
Figure 5:
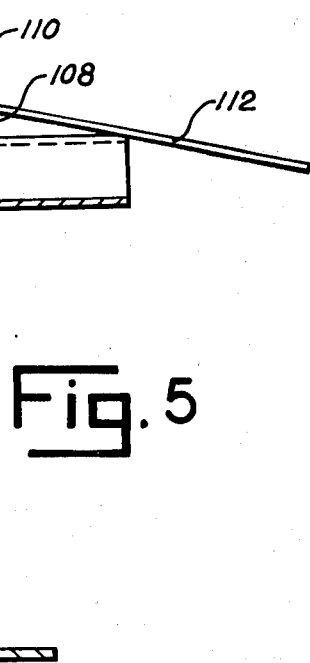
FIG. 5 is a vertical cross sectional view of the pedestal shown in FIG. 4, the section being taken on line 5 — 5 of the latter figure, showing the seat in the forward, latched and locked positions.
Figure 6:
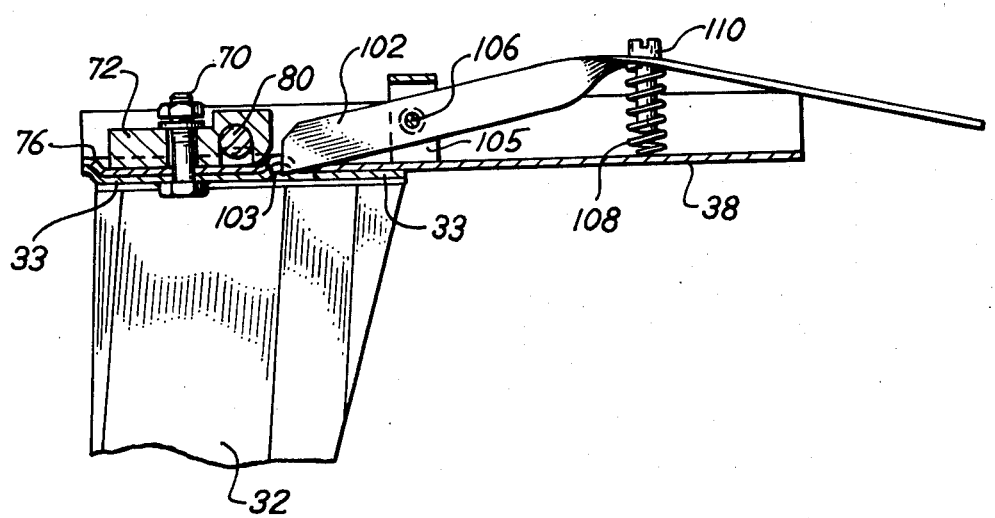
FIG. 6 is a fragmentary, vertical cross sectional view similar to that shown in FIG. 5, showing the seat support portion in its unlocked position.
Figure 7:
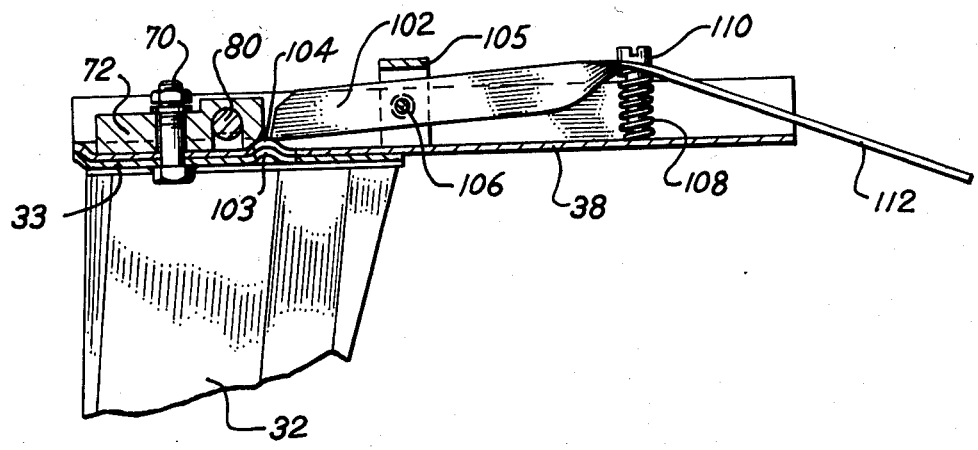
FIG. 7 is a fragmentary, vertical cross sectional view similar to that shown in FIGS. 6 and 7, showing the seat support portion in both unloked and unlatched position.

Referring more specifically to the drawings and to FIGS. 1 and 2 in particular, numeral 10 indicates generally a seat and pedestal assembly, numeral 12 a seat which for the purpose of the present invention may be considered conventional and includes a seat portion 14 and a back portion 16 attached to the seat portion by side brackets 18 and 20. Numeral 22 indicates generally the present pedestal on which the seat is mounted and firmly attached. Other seat structures and designs can be used with the present pedestal without changing the structure or design of the pedestal.

The seat pedestal 10 consists of a base 30, preferably constructed of a steel plate, and a steel post 32 joined integrally to the base by welding or other suitable securing means. The post has an upper plate 33 of steel rigidly connected by welding or other suitable securing means to the upper end of the post, and platform 34 is pivotally connected to the upper end of the post in a manner fully described hereinafter. The base, pedestal and seat assembly form a unit which is secured firmly to the vehicle floor or other suitable support by bolts or screws extending through holes 36 in the corners of base 30. The base is normally a flat plate; however, it may be contoured to follow the contour of a particular vehicle floor construction and configuration if desired.

The platform is of a generally channel-shaped configuration, having a bottom 38, upstanding sides 40 and 42, and outwardly extending flanges 44 and 46 connected to sides 40 and 42, respectively. Flange 44 is provided with holes 48 and 50, and flange 46 is provided with holes 52 and 54 for receiving screws or bolts extending upwardly through the flanges and into the seat frame structure not shown, for rigidly securing the seat on the platform. The platform and post are preferably constructed of heavy steel sheet material, and reinforcing gussets 56 and 58 are disposed on the forward side of the post to provide additional support to the portion of the platform projecting forwardly from the post, the pedestal being sufficiently rigid to form a firm support for the seat and the occupant thereof.

The platform 34 is pivotally connected to plate 33 and the upper end of post 32 by a bolt 70 extending through holes in plate 33 and in the bottom 38 of platform 34, and through a lever 72. The bolt permits the platform to rotate in either direction on the axis of the post to permit the seat to shift between the forwardly facing position and the side position at the adjacent door for the occupant to enter and leave the vehicle.

In order to provide an effective track or guide for the bottom of the platform on plate 33, intermeshing ribs and grooves 74 and 76 are provided on plate 33 and bottom 38 of the platform. The two annular intermeshing ribs and grooves are concentric with one another and with bolt 70 so that the platform, when unlocked, will rotate freely with respect to plate 33 and post 32. A shaft 80 with a handle 82, extends through a hole 84 in either side 40 or 42, and through a hole or slot in the inner end of lever 72, the handle, shaft, lever and bolt forming a lock or locking device 90 for holding the platform in any angular position on the axis of the post. The shaft 80 is round and is provided with notches 92 and 94. When the handle is in one position, as for example horizontal, as shown in FIG. 3, the two notches are out of engagement with rib 76 in bottom 38, and hence the full round portion of the shaft 80 is in engagement with the rib. This applies an upward pressure on the adjacent end of lever 72 and a downward pressure on the other end of the lever, thus applying an upward pressure on the bolt which clamps plate 33 and the bottom of the platform firmly together to hold the seat in any desired angular position. The pressure applied by the bolt when the handle is in its locking position causes a distortion at numeral 96 in plate 33, thereby firmly and independently holding the plate and bottom in fixed position relative to one another until they are released by releasing lock 90. In order to release the lock, the handle is pressed downwardly so that the two slots 92 and 94 register with rib 76 on the bottom of the platform, thereby releasing the downward pressure on the opposite end of lever 72 and the uppward pressure on bolt 70 and permitting the platform to rotate freely with respect to the upper end of the post. The platform can be locked in any angular position with respect to the post by merely returning the handle to its horizontal position where the full round portion of the shaft is in engagement with rib 76.

In order to assure centering of the seat in its forward position, a latch 100 is preferably provided, the latch consisting of a finger 102 which seats in slots 103 and 104 provided in the two ribs 74 and 76. The finger is pivoted to a bracket 105 by a bolt 106 and is urged into its latching position by a spring 108 disposed around a guide screw or pin 110. The finger is operated by a handle 112 which extends forwardly from the finger and which can be easily reached by the occupant from the front of the seat.

In the use and operation of the present seat pedestal, with the seat mounted thereon and the assembly mounted on a vehicle, the seat is normally in the forward position with the finger 102 of the latch extending inwardly into slots 103 and 104 of plate 33 and bottom 38, respectively. The seat is centered in the forwardly facing position by the latch 100, and is held in that position by the lock 90. With handle 82 in its horizontal position, the round portions of adjacent slots 92 and 94 apply pressure on rib 76, which in turn lifts the adjacent end of lever 72 and presses downwardly the opposite end lever of 72. The pressure thus applied raises the bolt and rigidly holds plate 33 and the platform on the upper end of post 32. When the seat is to be turned to the side to permit the occupant to leave or enter the vehicle, handle 82 is pressed downwardly so that the slots 92 and 94 of shaft 80 face rib 76, thus releasing the pressure on lever 72 and bolt 70. Handle 112 of latch 100 is pressed downwardly, thus pivoting the finger 102 upwardly to withdraw it from slots 103 and 104 of plate 33 and platform bottom 38. While handle 112 is depressed, the seat can be freely rotated to any angular position away from the center. If it is desired to hold the seat rigidly in some angular position, handle 82 is merely lifted to its horizontal position, thus causing shaft 80 to apply pressure to rib 76 and lift one end of lever 72 and bolt 70. When the seat is rotated to the forward position while in its unlocked condition, finger 102 is snapped into slots 103 and 104 by spring 108 when the seat reaches its center forward position. Handle 82 is then raised to its horizontal position, applying a force on rib 76, lever 72 and bolt 70, and rigidly holding the platform and plate 33 on the upper end of post 32 in rigid locked position, thus giving comfortable and safe support to the occupant of the seat.

While the latch mechanism 100 has been shown and described herein, it may be omitted from economy units if desired. Centering of the seat in forward position would be performed by the occupant and the seat held in addjusted position solely by the lock 90 when handle 82 is in the horizontal position. Other changes and modifications may be made in the present seat pedestal without departing from the scope of the present invention.

I claim:

1. A pedestal for a vehicle seat, comprising a base, a post secured to said base and having a horizontally disposed plate at the upper end thereof, a platform mounted on the upper end of said post for angular movement on a horizontal plane, a pivot means connecting said platform to said plate, a lever pivoted on said pivot means, and locking means including a handle having a shaft for pivoting said lever to urge said plate and platform in firm contact for holding said platform in any horizontal angular position with respect to the vertical axis of said post, said pivot means including a bolt extending through said plate, platform and lever, and with said lever applying a compressive force against said three parts when said handle is moved to the position for locking said platform in fixed position with respect to the said post.

2. A pedestal for a vehicle seat as defined in claim 1 in which said platform is provided with a rib means.

3. A pedestal for a vehicle seat as defined in claim 2 in which said shaft of said handle extends inwardly from a side of said platform in close proximity to said rib means and includes a means for engaging said rib means to apply pressure to said lever which in turn presses said platform and plate together.

4. A pedestal for a vehicle seat as defined in claim 3 in which said shaft extends over said rib means and is provided with slots which in one position span said rib means and in another position permit the shaft to engage said rib means to cause said shaft to apply pressure to said lever.

5. A pedestal for a vehicle seat as defined in claim 1 in which a latch means is provided for centering the seat in its forward position.

6. A pedestal for a vehicle seat as defined in claim 5 in which said latch means includes a handle extending forwardly and adapted to be reached by the occupant of the seat from the front thereof.

7. A pedestal for a vehicle seat as defined in claim 5 in which a rib means with a slot therein is provided and said latch means includes a finger for seating in said slots for centering the seat in the forward position.

8. A pedestal for a vehicle seat as defined in claim 7 in which a forwardly extending handle is provided for operating said finger to release the platform for angular rotation with respect to the vertical axis of said post.

* * * * *